(12) United States Patent
Shiozaki et al.

(10) Patent No.: US 8,118,148 B2
(45) Date of Patent: Feb. 21, 2012

(54) CONTROL METHOD OF EXTERNAL CONTROL TYPE FAN CLUTCH

(75) Inventors: Ken Shiozaki, Susono (JP); Yoshinobu Iida, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 552 days.

(21) Appl. No.: 10/826,988

(22) Filed: Apr. 19, 2004

(65) Prior Publication Data

US 2004/0223851 A1 Nov. 11, 2004

(30) Foreign Application Priority Data

Apr. 21, 2003 (JP) ................................ 2003-116072
Apr. 7, 2004 (JP) ................................ 2004-113606

(51) Int. Cl.
*F16D 31/00* (2006.01)
(52) U.S. Cl. .................... 192/58.61; 417/223; 192/84.31
(58) Field of Classification Search .................... 417/15, 417/223; 192/58.61, 84.31
See application file for complete search history.

(56) References Cited

U.S. PATENT DOCUMENTS

| | | | |
|---|---|---|---|
| 3,924,585 A | 12/1975 | Woods | |
| 4,228,880 A | 10/1980 | Gee | |
| 4,556,138 A * | 12/1985 | Martin et al. | 192/58.61 |
| 5,467,854 A * | 11/1995 | Creger et al. | 192/87.18 |
| 5,484,045 A | 1/1996 | Kikuchi et al. | |
| 5,575,368 A | 11/1996 | Kikuchi et al. | |
| 5,636,719 A | 6/1997 | Davis et al. | |
| 5,816,376 A | 10/1998 | Hatori | |
| 6,013,003 A | 1/2000 | Boffelli et al. | |
| 6,079,536 A | 6/2000 | Hummel et al. | |
| 6,247,567 B1 * | 6/2001 | Watanabe | 192/58.43 |
| 6,550,596 B2 * | 4/2003 | Shiozaki et al. | 192/58.61 |
| 6,591,174 B2 | 7/2003 | Chung et al. | |
| 6,648,115 B2 | 11/2003 | Smith et al. | |
| 2002/0003075 A1 * | 1/2002 | Shiozaki et al. | 192/58.61 |
| 2004/0223851 A1 | 11/2004 | Shiozaki et al. | |

FOREIGN PATENT DOCUMENTS

| | | |
|---|---|---|
| JP | 9-119455 | 5/1997 |
| JP | 2911623 | 6/1999 |
| JP | 4-51219 | 12/1999 |
| JP | 2001-027260 | 1/2001 |
| JP | 2002-013556 | 1/2002 |
| JP | 2003-239741 | 8/2003 |

* cited by examiner

*Primary Examiner* — Devon C Kramer
*Assistant Examiner* — Peter J Bertheaud
(74) *Attorney, Agent, or Firm* — Gerald E. Hespos; Michael J. Porco (57) ABSTRACT

The invention provides a control method of an external control type fan clutch able to improve engine performance, fuel cost and cooling performance of a capacitor of an air conditioner (A/C) and restrain fan noises due to associative rotation. Namely, in the external control type fan clutch device constructed so as to control the opening and closing of a supply adjusting hole of oil by a valve member operated by an electromagnet, the opening and closing of the supply adjusting hole of the oil is on-off-controlled with the temperature of a cooling liquid of a radiator, a fan rotating speed, the temperature of transmission oil, a vehicle speed, an engine rotating speed, the pressure of a compressor of the air conditioner, etc. as parameters.

3 Claims, 11 Drawing Sheets

CONTROL METHOD OF EXTERNAL CONTROL TYPE FAN CLUTCH

TECHNICAL FIELD

The present invention generally relates to a control method of an external control type fan clutch of a system in which fan rotation for cooling an engine in an automobile, etc., is controlled in accordance with a temperature change of the external circumference and changes of conditions of driving.

BACKGROUND ART

As a fan-coupling device of this kind, the interior of a sealing housing constructed by a case and a cover is partitioned into an oil reservoir chamber and a torque transmission chamber for internally mounting a drive disk by a partition plate having a supply adjusting hole of oil. A dam is formed in one portion of the inner circumferential wall face of the sealing housing side opposed to the outer circumferential wall portion of the drive disk for collecting and reservoiring the oil at the rotating time. A circulating flow passage is formed between oil reservoir chambers by the torque transmission chamber so as to be connected to the dam. The fan-coupling device has a valve member for opening the supply adjusting hole of the above partition plate when the temperature of the external circumference exceeds a set value. When the temperature is equal to or lower than the set value or less, the valve member closes the supply adjusting hole of the above partition plate. In a system for controlling the torque transmission from the drive side to the sealing housing side of the driven side by increasing and decreasing an effective contact area of the oil in a torque transmission clearance portion arranged on an opposite wall face near the exterior of the drive disk and the above sealing housing, a pair of electromagnets are arranged on the front face side or the rear face side of the above sealing housing. A valve member is arranged so as to be opposed to one of the electromagnets and has a magnetic property for opening and closing the supply adjusting hole. Further, a sub-valve member is arranged so as to be opposed to the other electromagnet and has a magnetic property for opening and closing the above circulating flow passage (see Japanese Patent No.2911623).

However, the above conventional external control type fan-coupling device has a structure in which the electromagnet and an armature for operating the valve member are separated by the case of a non-magnetic material. Therefore, no magnetic force of the electromagnet can be efficiently transmitted to the armature. Further, excessive electromagnetic force is required to attract the armature, and the size and weight of the electromagnet are increased. Accordingly, problems exist in that no fan-coupling device can be made compact and light in weight and a large amount of electric power consumption is required. Further, when the armature is located in the position separated from a rotating shaft within the oil reservoir chamber, there is a disadvantage in that the operation of the armature, i.e., the operating property of the opening and closing of the valve member becomes worse by receiving the resistance of the oil since the armature always exists within the oil during the rotation of the fan.

Therefore, the present inventors previously proposed an external control type fan-coupling device (JP-A-2003-239741). In this external control type fan-coupling device, a magnetic material of a ring shape is arranged between the above electromagnet and the valve member. The external control type fan-coupling device is constructed so as to assemble the magnetic material into the sealing housing such that a magnetic flux of the electromagnet is transmitted to the valve member through the magnetic material. Thus, the fan-coupling device is made compact and light in weight and electric power is saved and fan rotation controllability is improved.

On the other hand, a viscous fluid joint for transmitting output driving torque to a radiator cooling fan by driving torque from the engine of the vehicle, and its control method are disclosed in JP-A-9-119455. This viscous fluid joint has a system for changing the oil supplying amount by opening and closing the valve by the deformation of a bimetal reacting on the temperature of a passing wind of the radiator, and changing the fan rotation. This system will be explained in more detail. An object of this system is to prevent fan noises and slip heat in a low idle state at the stopping time of the vehicle. In this system, the rotating speed of the vehicle engine is detected and its actually measured value is compared with a limit value set in advance. When the rotating speed of the engine is smaller than the limit value, the rotating speed of the radiator cooling fan is detected and the fan rotating speed is compared with a fan speed limit value determined in advance. In contrast to this, when the fan rotating speed is greater than the limit value, a process for correcting an input signal to move the valve member to the closing position is set.

DISCLOSURE OF INVENTION

However, no temperature of an engine cooling liquid having an influence on engine cooling performance can be set to a direct control object in the latter control method (JP-A-9-119455) of the viscous fluid joint of the system for changing the oil supply amount by opening and closing the valve by deforming the bimetal reacting on the temperature of the passing wind of the radiator, and changing the fan rotation. Therefore, this control method has disadvantages in that a horsepower loss is caused by the unnecessary fan rotation, and fuel cost becomes worse, and no preferable fan rotation for cooling a capacitor of an air conditioner (A/C) can be maintained and no fan noises due to associative rotation of the unnecessary fan rotation at an accelerating time can be restrained, etc.

Further, in the conventional control method of the external control type fan clutch, when the clutch is once turned on and is rotated by setting a control area of the fan rotating speed from an OFF rotating area to an entire ON rotating area, responsibility to control support just after this rotation of the clutch is bad and the associative rotation is generated. Further, since only the fan rotating speed is set to a judging material of the control, this control method has disadvantages in that the associative rotation is generated at a sudden changing time of the engine rotating speed, and a fan rotating behavior becomes unstable, etc.

The present invention is made to dissolve the disadvantages in the control method of the viscous fluid joint of the system for changing the oil supply amount by opening and closing the valve by deforming the bimetal reacting on the above temperature of the passing wind of the radiator, and changing the fan rotation, and the disadvantages of the conventional control method of the external control type fan clutch. The present invention provides a control method of the external control type fan clutch for improving engine performance and fuel cost and improving cooling performance of the capacitor of the air conditioner (A/C) and restraining the fan noises due to the associative rotation and reducing a response delay with respect to control instructions of the fan rotation and reducing the associative rotation at the engine rotation changing time and the engine starting time and stabilizing the fan rotating behavior.

The first aspect of the present invention resides in a control method of an external control system fan clutch characterized in that the interior of a sealing housing constructed by a case of a non-magnetic material supported through a bearing on a rotating shaft body fixedly attaching a drive disk to its tip and a cover attached to this case is partitioned into an oil reservoir chamber and a torque transmission chamber for internally mounting said drive disk by a partition plate; a dam is arranged in one portion of the inner circumferential wall face of the cover opposed to the outer circumferential wall portion of the drive disk for collecting and reservoiring oil at the rotating time, and a valve member having a magnetic property and opening and closing an oil circulating flow passage formed between the torque transmission chamber and the oil reservoir chamber is connected to the dam and is arranged within the oil reservoir chamber; an electromagnet is supported by said rotating shaft body through the bearing on the oil reservoir chamber side of said sealing housing, and a mechanism for controlling the opening and closing of the oil circulating flow passage is constructed by operating said valve member by the electromagnet; and the external control type fan clutch is constructed by a system for controlling rotating torque transmission from the drive side to the driven side by increasing and decreasing an effective contact area of the oil in a torque transmission clearance portion formed by the drive side and the driven side; wherein the opening and closing of said valve member are controlled on the basis of at least one signal of the cooling liquid temperature of a radiator, a fan rotating speed, the temperature of transmission oil, a vehicle speed, an engine rotating speed, the pressure of a compressor of an air conditioner, and a turning-on or turning-off signal of the air conditioner.

Further, the second aspect of the present invention resides in similar to the above case, in another control method of the external control type fan clutch, a mechanism for controlling the opening and closing of the oil circulating flow passage is constructed by operating the valve member by the electromagnet, and the external control type fan clutch is constructed by a system for controlling rotating torque transmission from the drive side to the driven side by increasing and decreasing an effective contact area of the oil in a torque transmission clearance portion formed by the drive side and the driven side. A magnetic material of a ring shape is arranged between said electromagnet and the valve member, and is constructed by assembling the magnetic material into the sealing housing so as to transmit a magnetic flux of the electromagnet to the valve member through the magnetic material. This control method of the external control type fan clutch is characterized in that an upper limit rotating speed is set to an optimum fan rotating speed required from the engine side. Otherwise, a fan rotating speed control signal is temporarily stopped on the basis of the differential speeds between an engine rotating speed, the fan rotating speed and said optimum fan rotating speed. Otherwise, the fan rotating speed control signal is temporarily stopped on the basis of an engine rotating acceleration or an accelerator (throttle) position acceleration. Otherwise, a limit is given to a changing rate of the optimum fan rotating speed on the basis of the changing rate of said optimum fan rotating speed.

In the above external control type fan clutch may also has a constitution that, a magnetic material of a ring shape may be arranged between said electromagnet and the valve member, the magnetic material is assembled into the sealing housing so as to transmit a magnetic flux of the electromagnet to the valve member through the magnetic material.

In accordance with the control method of the present invention, the fan rotation can be controlled so as to always lie in a preferable temperature range of engine combustion efficiency by controlling the temperature of the cooling liquid of the radiator as a direct control parameter. Further, the fan rotation preferable in cooling efficiency of the capacitor of the air conditioner can be maintained and cooling performance of the air conditioner can be improved by always detecting the on-off situation of the air conditioner and the compressor pressure. Further, the associative rotation of the fan due to starting acceleration and outrunning acceleration from an idle time can be prevented and fan noises can be reduced by detecting the engine rotating speed and an accelerator aperture. Further, the upper limit rotating speed is set to the optimum fan rotating speed required from the engine side. The fan rotating speed control signal is temporarily stopped (cut) on the basis of the differential speeds between the engine rotating speed, the fan rotating speed and the optimum fan rotating speed. The fan rotating speed control signal is temporarily stopped (cut) on the basis of the engine rotating acceleration or the accelerator (throttle) position acceleration. The limit is given to the changing rate of the optimum fan rotating speed on the basis of the changing rate of the optimum fan rotating speed. The following many excellent effects can be obtained by taking such means, etc. Namely, the response delay with respect to control instructions of the fan rotation is reduced, and the associative rotation is reduced at the engine rotation changing time, the engine starting time, etc., and the fan rotating behavior can be stabilized. Further, fan consumption horsepower is reduced (fuel cost is improved) and fan noises are reduced, etc.

BEST MODE FOR CARRYING OUT THE INVENTION

Figure 1:
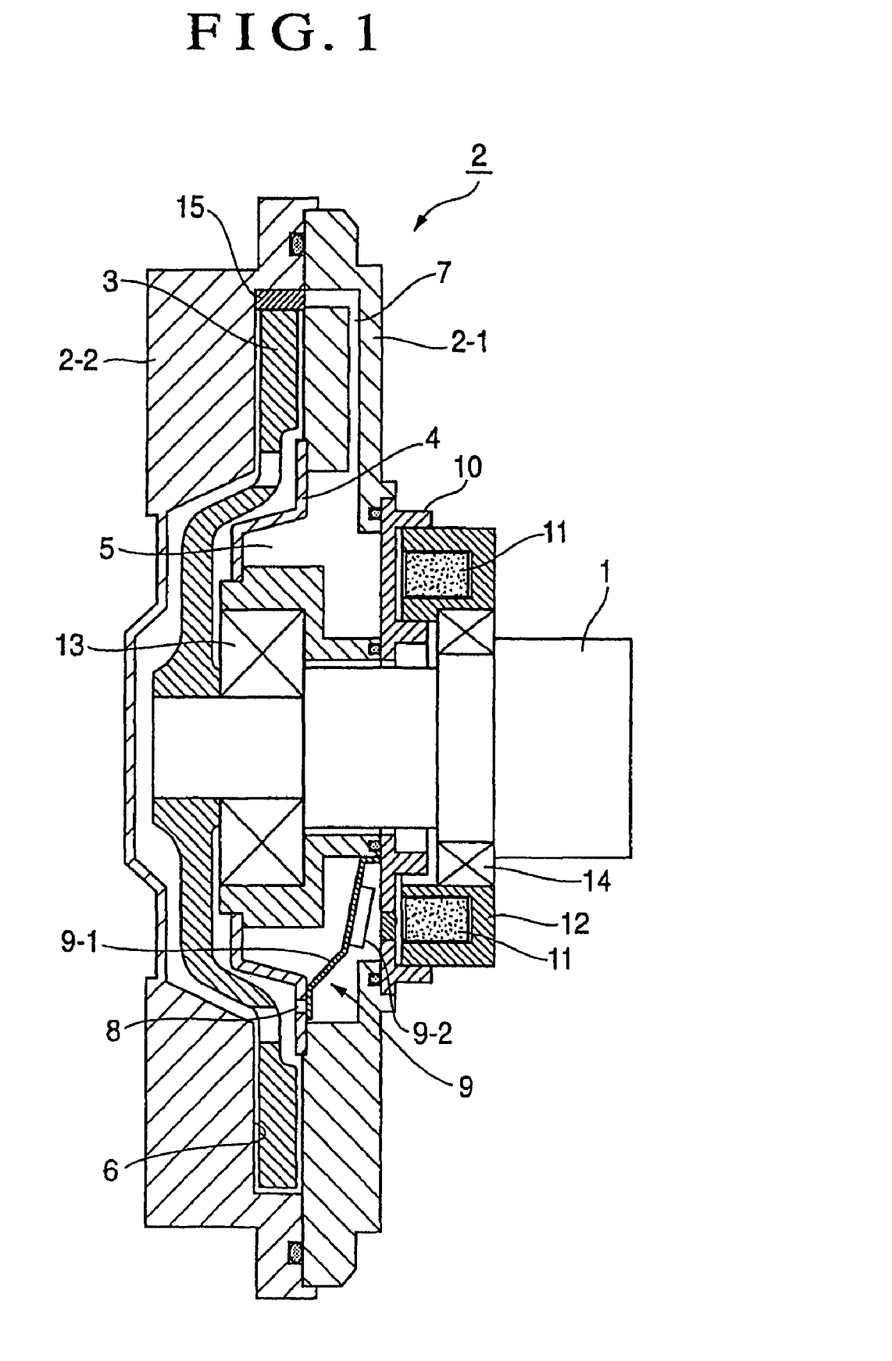
FIG. 1 is a longitudinal cross-sectional view showing one embodiment of an external control type fan-coupling device in the present invention.

In the present invention, the external control type fan clutch device shown in FIG. 1, a sealing housing 2 constructed by a case 2-1 and a cover 2-2 is supported by a rotating shaft body (drive shaft) 1 rotated by driving a driving section (engine) through a bearing 13. The interior of this sealing housing 2 is partitioned into an oil reservoir chamber 5 and a torque transmission chamber 6 by a partition plate 4 with an oil supply adjusting hole 8. A drive disk 3 fixedly attached to the tip of the rotating shaft body 1 is stored into the torque transmission chamber 6 so as to form a torque transmitting clearance between the drive disk 3 and the inner circumferential face of the torque transmission chamber.

A dam 15 is arranged in one portion of the inner circumferential wall face of the cover 2-2 opposed to the outer circumferential wall portion of the drive disk 3 for collecting and reservoiring oil at the rotating time.

A valve member 9 for oil supply for opening and closing a circulating flow passage 7 for oil collection arranged in the case 2-1 is constructed by a leaf spring 9-1 and an armature 9-2. The base end portion of the leaf spring 9-1 is attached to the case 2-1 so as not to easily receive the resistance of the oil within the oil reservoir chamber 5 at the fan rotating time such that the armature 9-2 of the valve member is located in the vicinity of the rotating shaft body (drive shaft) 1.

An electromagnet 11 is supported by an electromagnet support body 12 supported by the rotating shaft body 1 through a bearing 14 on the driving section side of the sealing housing 2. Further, a magnetic loop element (magnetic material) 10 of a ring shape assembled into the case 2-1 is attached so as to be opposed to the armature 9-2 of the above valve member. One portion of the above electromagnet support body 12 is irregularly fitted to the magnetic loop element 10. Namely, an operating mechanism of the valve member 9 for oil supply is constructed by using the magnetic loop element 10 of the ring shape to efficiently transmit a magnetic flux of the electromagnet 11 to the armature 9-2 of the valve member.

In the fan clutch device of the above construction, when the electromagnet 11 is turned off (non-magnetized), the oil supply adjusting hole 8 is closed by separating the armature 9-2 from the magnetic loop element 10 by the operation of the leaf spring 9-1. Thus, the supply of the oil into the torque transmission chamber 6 is stopped. In contrast to this, when the electromagnet 11 is turned on (magnetized), the armature 9-2 is attracted onto the magnetic loop element 10 side against the leaf spring 9-1. Thus, the leaf spring 9-1 comes in press contact with the case 2-1 side and the oil supply adjusting hole 8 is opened so that the oil is supplied into the torque transmission ream-chamber 6.

Figure 2:
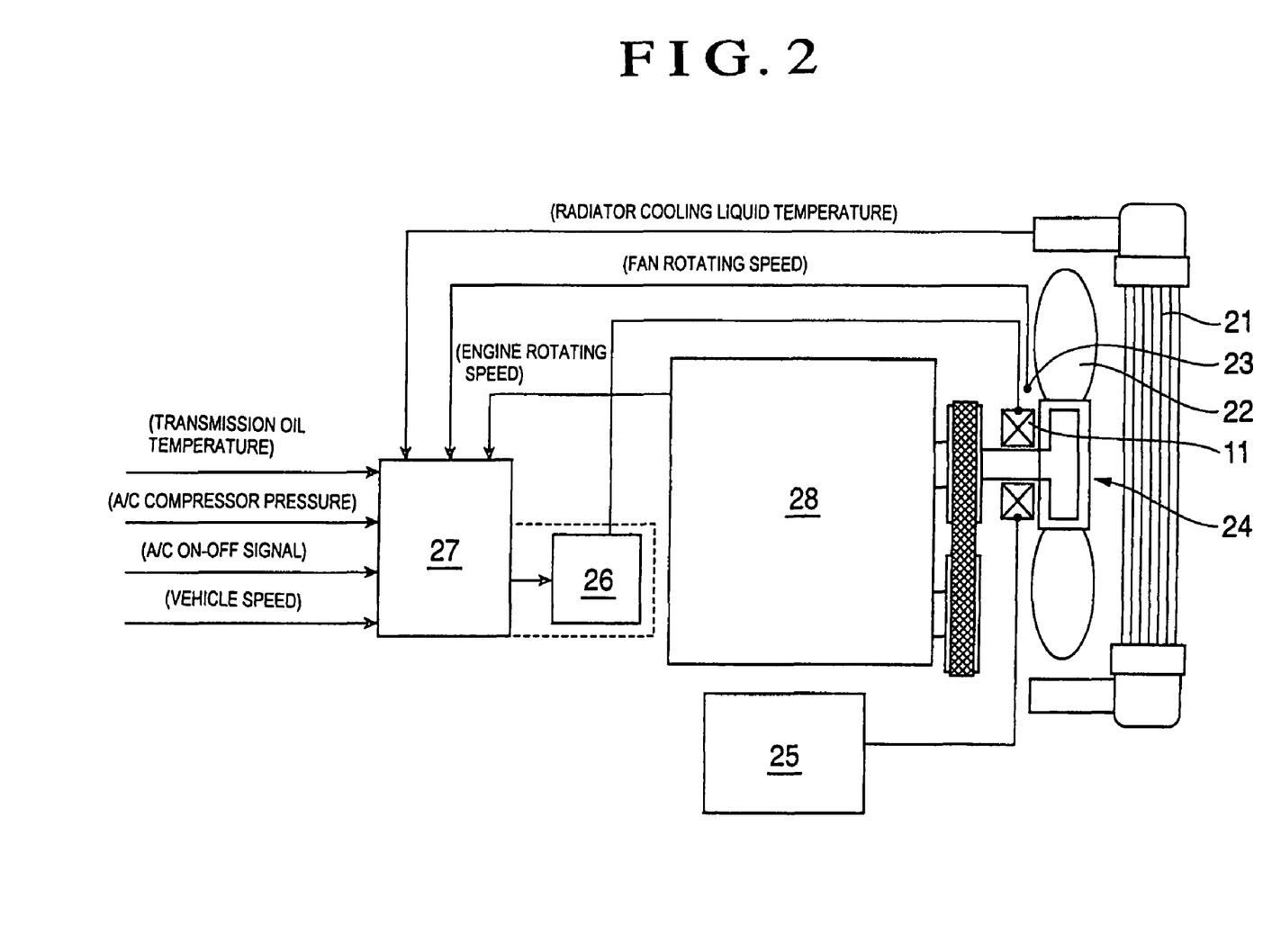
FIG. 2 is a schematic view showing one example of the entire construction of a control system for executing a control method of the above external control type fan clutch device.

The control system for executing the control method of the above external control type fan clutch device will next be explained on the basis of FIG. 2.

First, the cooling liquid temperature of a radiator 21, the rotating speed of a fan 22, the temperature of transmission oil, a vehicle speed, the rotating speed of the engine 28, the compressor pressure of an air conditioner, an on or off signal of the air conditioner, etc. are fetched to a main arithmetic controller 27. An optimum fan rotating speed (fan rotating speed area) is judged by the main arithmetic controller. A valve opening-closing signal required to change the fan rotation is sent to a relay within the main arithmetic controller 27, or a relay housing 26 as a body separated from the main arithmetic controller 27. In this relay or the relay housing 26, switching is performed and power is supplied to the electromagnet 11 of the fan clutch device 24 and the oil supply valve 9 is opened and closed. The fan rotation changed by the oil supply using this valve opening and closing is sensed and data are fed back to the main arithmetic controller 27. In the control system, the optimum fan rotating speed (fan rotating speed area) is again judged on the basis of data such as the cooling liquid temperature of the radiator 21, the transmission oil temperature, the vehicle speed, the engine rotating speed, etc. In FIG. 2, reference numerals 23 and 25 respectively designate a fan rotating sensor and a battery.

Figure 3:
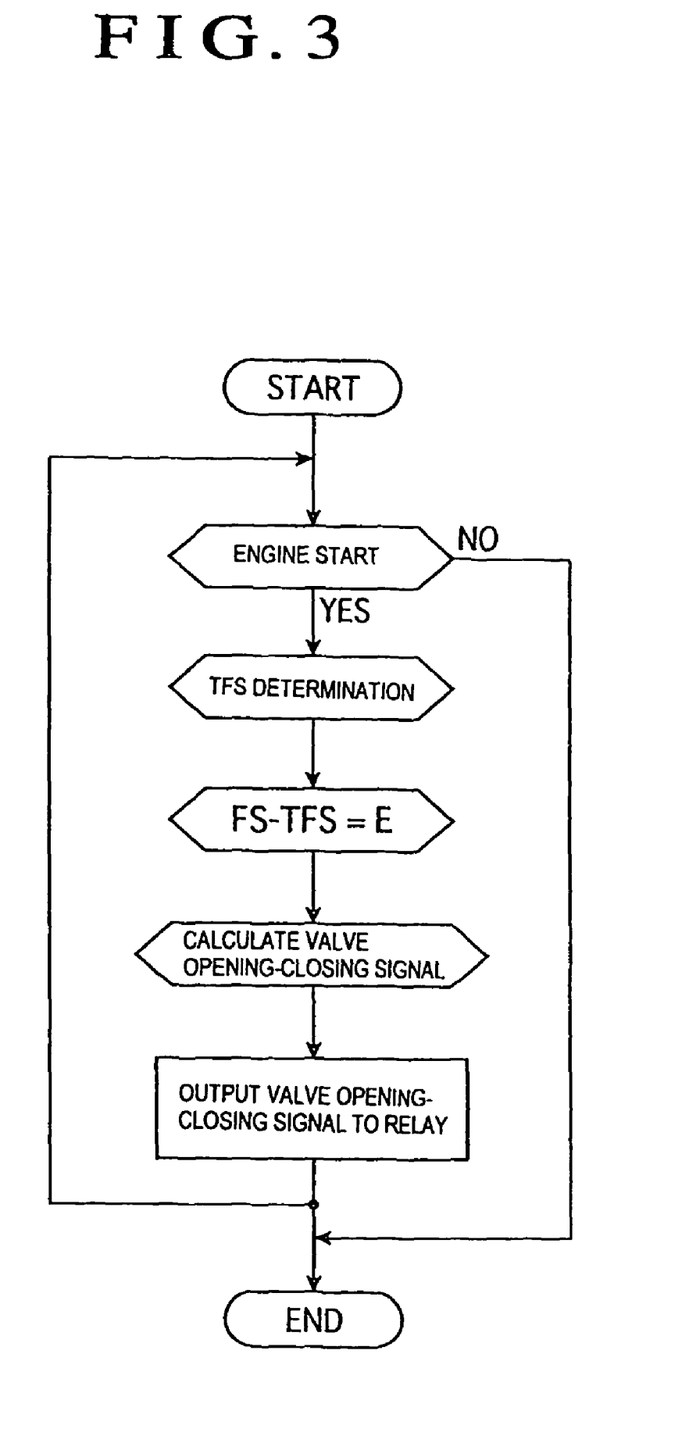
FIG. 3 is a flow chart showing one embodiment of the control method of the above external control type fan clutch device.
Figure 4:
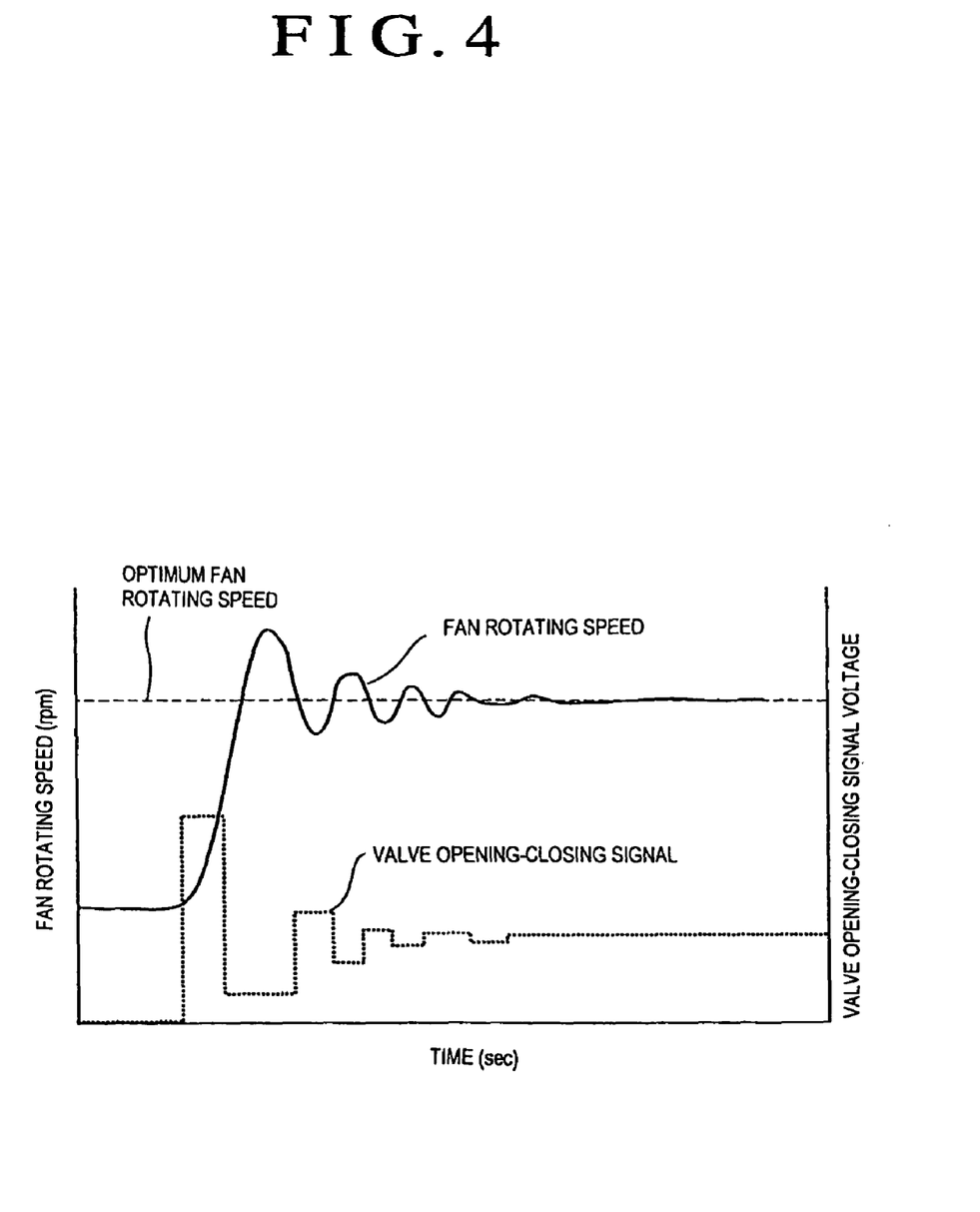
FIG. 4 is a view showing a fan rotating control example using the control system shown in FIG. 2.

The control method of the present invention using the control system shown in FIG. 2 will be subsequently explained on the basis of FIGS. 3 and 4.

Namely, the optimum fan rotating speed (TFS) is determined on the basis of data such as the cooling liquid temperature of the radiator, the transmission oil temperature, the vehicle speed, the engine rotating speed, etc. during vehicle running. The deviation E (FS−TFS=E) between this optimum fan rotating speed (TFS) and the actual fan rotating speed FS is calculated. A valve opening-closing signal is calculated on the basis of this deviation E and is outputted to the relay and the oil supply valve of the fan clutch device is opened and closed. FIG. 4 shows its fan rotating control example. In this example, the rotating speed of the cooling fan can be controlled to the optimum rotating speed (TFS) by the valve opening-closing signal calculated on the basis of the deviation E with respect to the actual fan rotating speed FS.

For example, (α) an on/off rate of power voltage, (β) a power voltage frequency and (γ) an electric power amount of the power source can be used as the above valve opening-closing signal.

Figure 5:
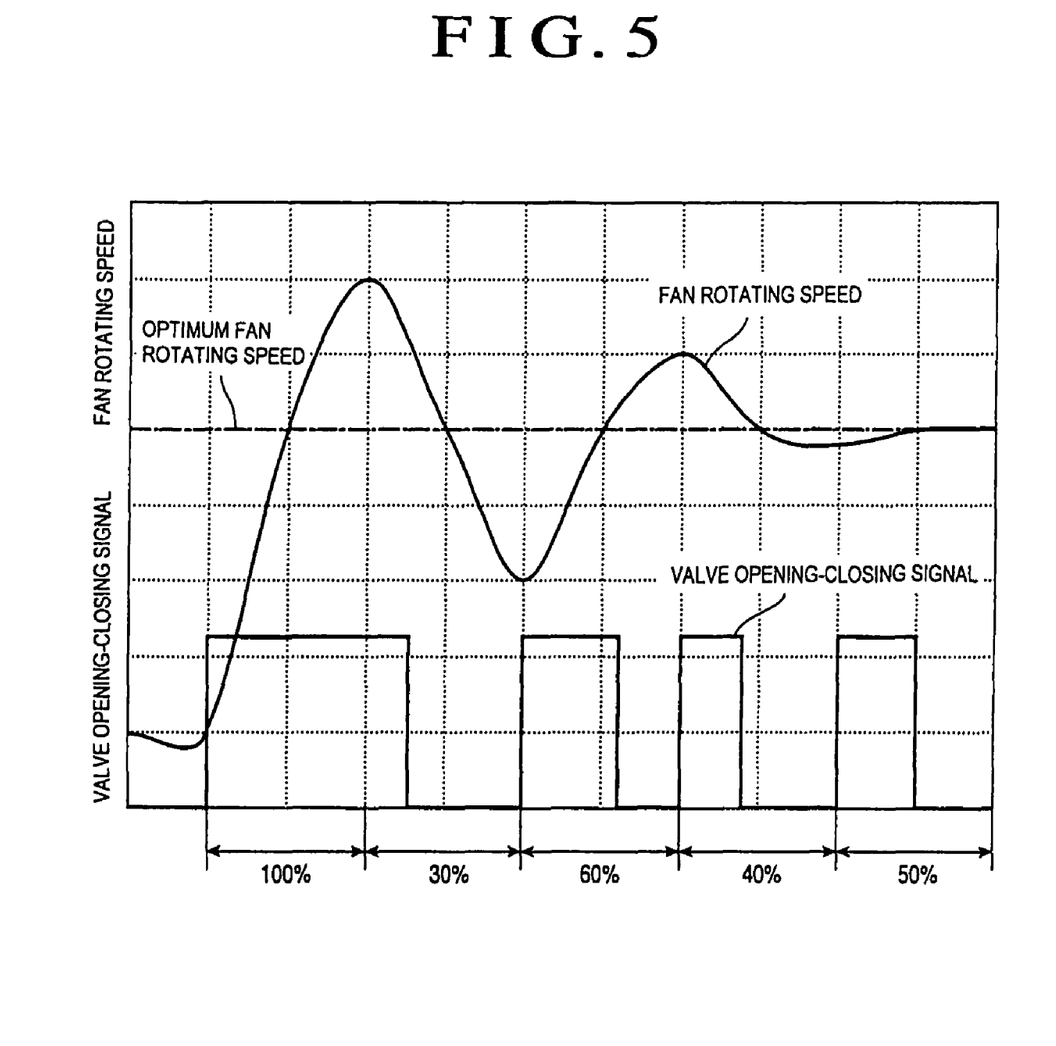
FIG. 5 is a view showing an example in which the fan rotation is controlled with an on-off rate of power voltage as a valve opening-closing control signal in the fan rotating control example using the control system shown in FIG. 2.
Figure 6:
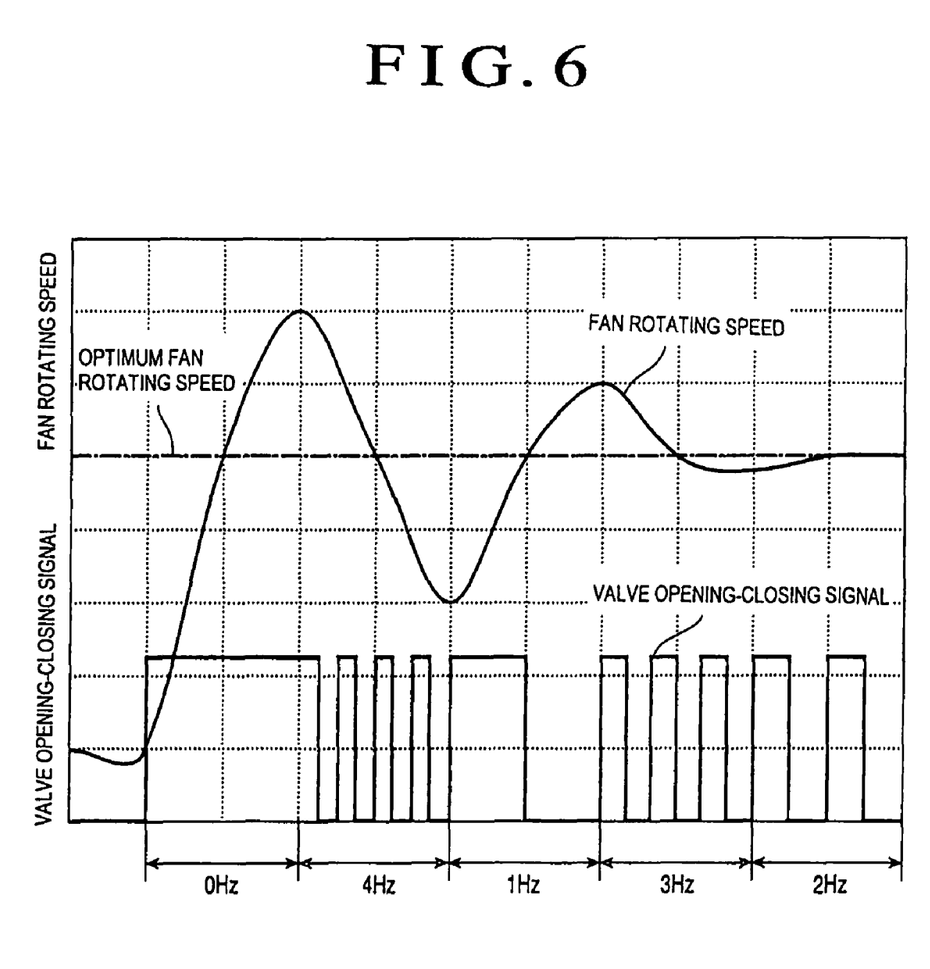
FIG. 6 is a view showing an example in which the fan rotation is controlled with an on-off frequency of the power voltage as the valve opening-closing control signal in the fan rotating control example using the control system shown in FIG. 2.
Figure 7:
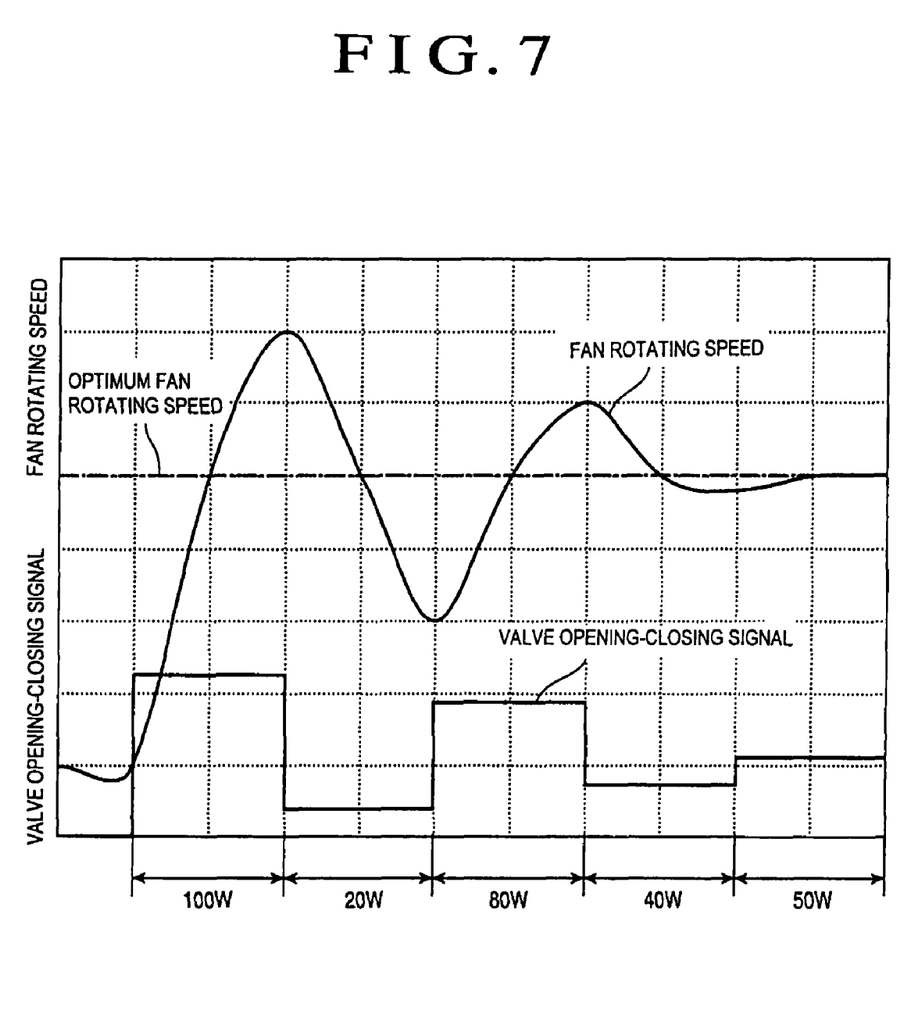
FIG. 7 is a view showing an example of the fan rotation with an electric power amount (W) of the power source as the valve opening-closing control signal in the fan rotating control example in the control system shown in FIG. 2.

FIG. 5 shows an example in which the fan rotation is controlled to the optimum fan rotating speed (TFS) with (α) the on-off rate of the power voltage as a valve opening-closing control signal. FIG. 6 shows an example in which the fan rotation is controlled to the optimum fan rotating speed (TFS) with (β) the on-off frequency of the power voltage as the valve opening-closing control signal. FIG. 7 shows an example in which the fan rotation is controlled to the optimum fan rotating speed (TFS) with (γ) the electric power amount (W) of the power source as the valve opening-closing control signal. As can be seen from these control examples, the fan rotating speed is changed by detecting data such as the cooling liquid temperature of the radiator, the transmission oil temperature, the vehicle speed, the engine rotating speed, etc. in the present invention. Accordingly, the temperature of water can be held in a certain area and the turning-on and turning-off operations of the fan clutch device can be controlled in accordance with the engine rotating speed irrespective of the cooling liquid temperature of the radiator so that fan noises due to the associative rotation can be prevented.

In addition to the above parameters, transmission temperature, suction air temperature, an AC compressor pressure, an accelerator aperture, etc. can be also set to parameters for judging the fan rotating control as control factors.

Figure 8:
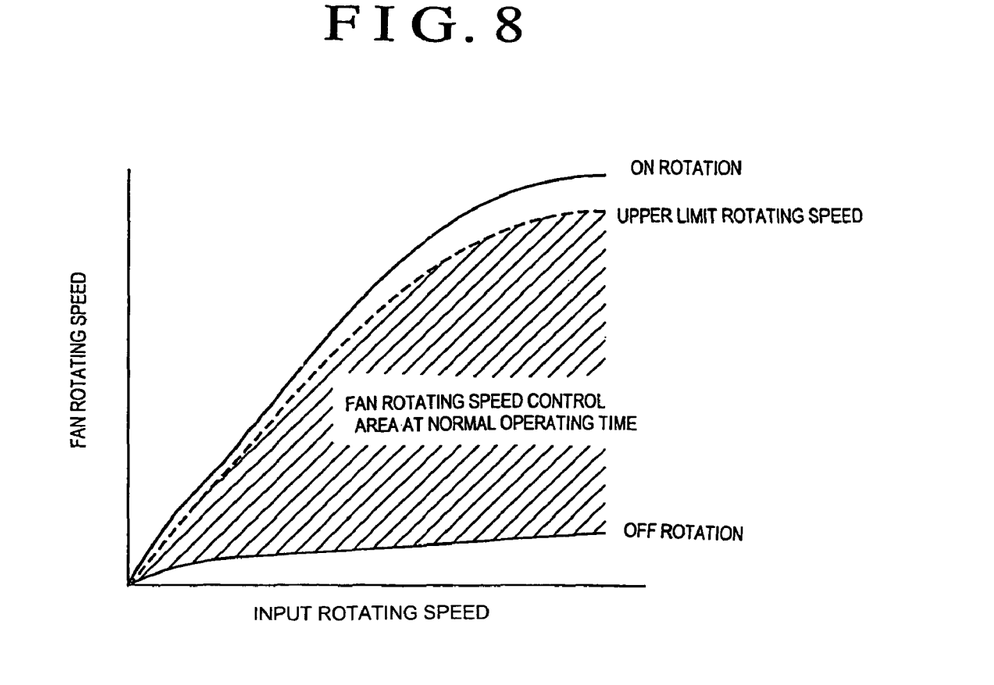
FIG. 8 is a view showing an example in which the fan rotating speed is controlled by setting an upper limit rotation number with respect to an optimum fan rotating speed (ETFS) required from the engine side in the fan rotating control example using the control system shown in FIG. 2.

FIG. 8 shows a control example in which the associative rotation is reduced by shortening a response delay with respect to control instructions of the fan, rotating speed, and illustrates a method for controlling the fan rotating speed by setting an upper limit rotating speed to an optimum fan rotating speed (ETFS) required from the engine side. In this control method, an upper limit rotating speed line is set in the position at a slightly low turning-on rotating speed as shown in FIG. 8 with respect to the optimum fan rotating speed (ETFS) required from the above engine side during the normal operation. The rotating speed on this line is controlled as an upper limit of the fan rotating speed.

Namely, when the clutch is set to the turning-on state, the oil excessively enters the interior of the torque transmission chamber of the clutch and is left. Therefore, when a signal for reducing the fan rotating speed is outputted in the next timing, a reaction with respect to the signal is delayed by a time required to collect the above oil. Further, the excessive oil within the torque transmission chamber becomes a factor causing the associative rotation when the engine rotating speed is changed in an instant from low speed rotation to high speed rotation as in a case in which the vehicle is started and accelerated from an idling state. Therefore, no excessive oil enters the interior of the torque transmission chamber by setting the upper limit rotating speed of the optimum fan rotating speed (ETFS) in the position of the clutch slightly lower than that in the turning-on rotation, and controlling the fan rotating speed. Therefore, the response delay with respect to the fan rotating speed control signal of the next timing can be shortened as much as possible, and the associative rotation at the engine rotation changing time and the engine starting time can be reduced.

Figure 9:
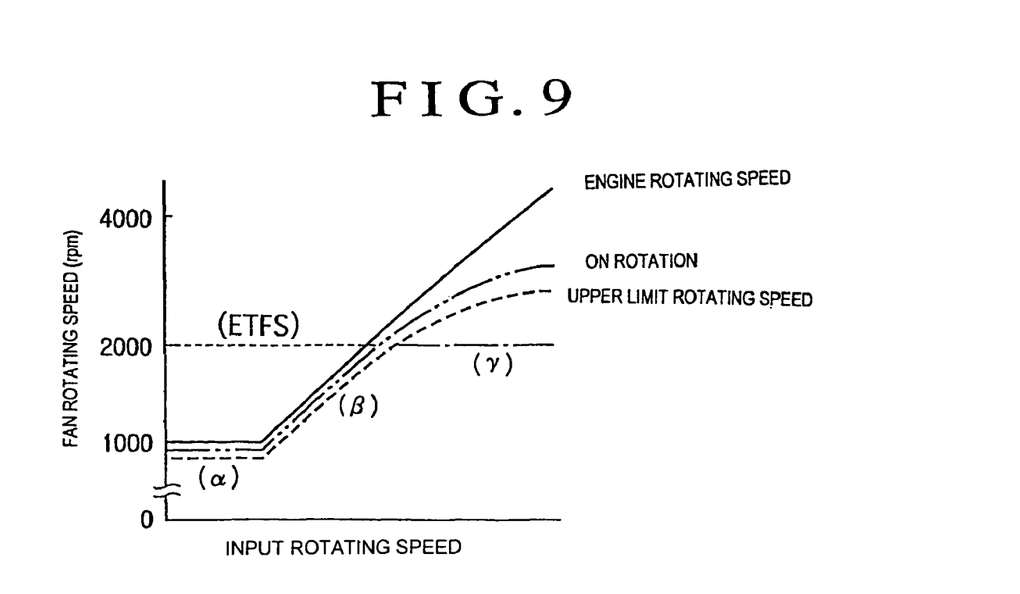
FIG. 9 is a view showing a concrete example of the fan rotating speed control in which an upper limit rotating speed line is similarly set with respect to the optimum fan rotating speed (ETFS).

FIG. 9 shows a concrete example of the fan rotating speed control in which the upper limit rotating speed line is set with respect to the above optimum fan rotating speed (ETFS). In this example, when the engine rotating speed (ES) is changed from 1000 rpm to 4000 rpm and the optimum fan rotating speed (ETFS) is constantly set to 2000 rpm, ($\alpha$) the fan rotating speed (FS) is controlled onto the upper limit rotating speed line when the engine rotating speed (ES) is set to a constant state of 1000 rpm. Similar to the above case, ($\beta$) the fan rotating speed (FS) is controlled onto the upper limit rotating speed line when the engine rotating speed (ES) is set to an accelerating state from 1000 rpm to 2000 rpm. ($\gamma$) The fan rotating speed (FS) is constantly controlled at 2000 rpm when the engine rotating speed (ES) is set to a state accelerated from 2000 rpm to 4000 rpm.

Here, the upper limit rotating speed line can be determined by a formula (approximate formula) with the engine rotating speed (n) as a variable, etc.

Figure 10:
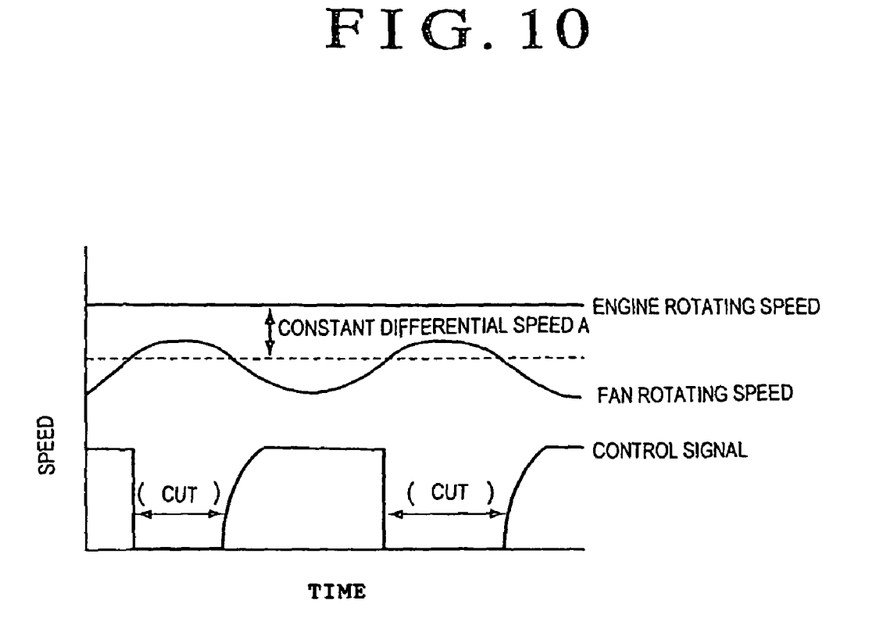
FIG. 10 is a view showing a control example in which a fan rotating control signal is temporarily stopped (cut) when the differential speed between the engine rotating speed (ES) and the fan rotating speed (FS) is smaller than a certain value (constant differential speed A) (ES−FS<A).
Figure 11:
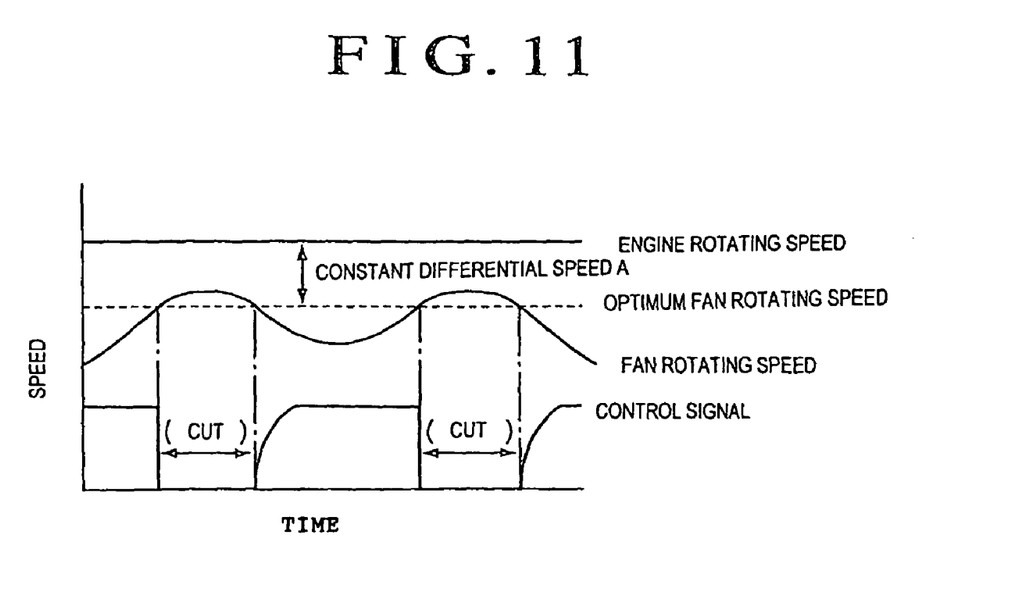
FIG. 11 is a view showing a control example in which the fan rotating control signal is temporarily stopped (cut) when the differential speed between the engine rotating speed (ES) and the optimum fan rotating speed (ETFS) is similarly smaller than the certain value (constant differential speed A) and the fan rotating speed (FS) is larger than the optimum fan rotating speed (ETFS) (ES−ETFS<A, and FS>ETFS).

FIGS. 10 and 11 show control examples in which the associative rotation at the changing time of the engine rotation is reduced by temporarily stopping (cutting) a fan rotating speed control signal on the basis of the differential speeds between the engine rotating speed, the fan rotating speed (actually measured value) and the optimum fan rotating speed. In the control example of FIG. 10, the fan rotation control signal is temporarily stopped (cut) when the differential speed between the engine rotating speed (ES) and the fan rotating speed (FS) is smaller than a certain value (constant differential speed A) (ES−FS<A). In the control example of FIG. 11, the fan rotation control signal is temporarily stopped (cut) when the differential speed between the engine rotating speed (ES) and the optimum fan rotating speed (ETFS) is smaller than a certain value (constant differential speed A) and the fan rotating speed (FS) is larger than the optimum fan rotating speed (ETFS) (ES−ETFS<A, and FS>ETFS).

Namely, the fan clutch as an object of the control system of the present invention has a system for collecting the oil into the torque transmission chamber by the differential speed between input rotation and a receiving portion (fan). Accordingly, when the above differential speed is reduced, the collecting speed of the oil is reduced, which becomes a cause of the associative rotation at the changing time of the engine rotation (low speed rotation→high speed rotation). Accordingly, it is judged that this differential speed becomes smaller than a certain value, and the fan rotating speed control signal is temporarily stopped (cut). Thus, the excessive supply of the oil is prevented and the associative rotation can be reduced.

Figure 12:
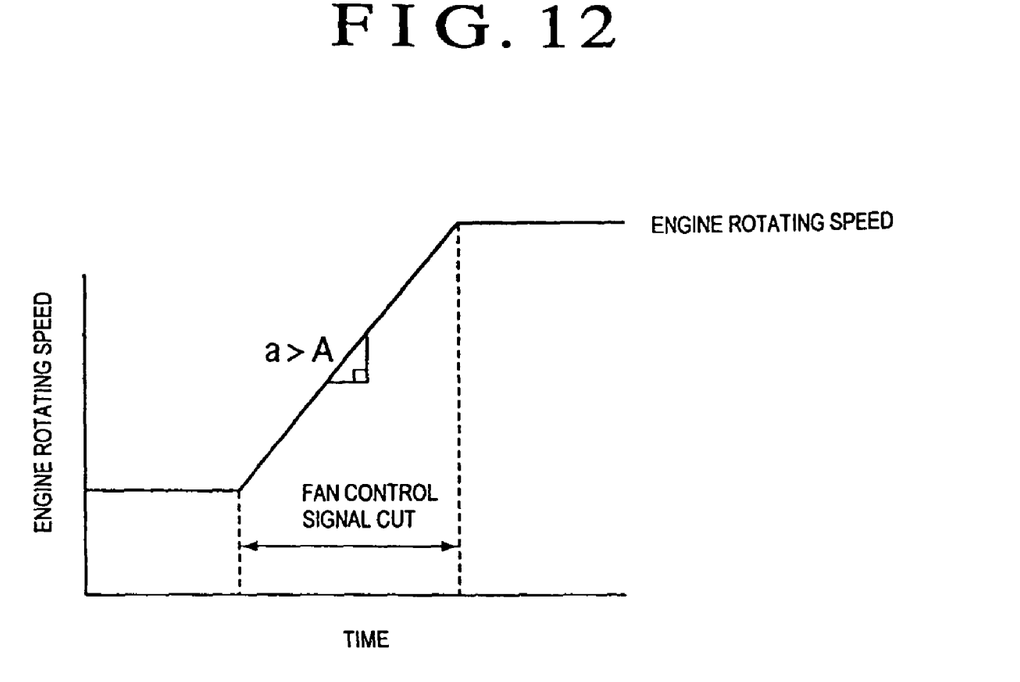
FIG. 12 is a view showing a control example in which the fan rotating speed control signal is stopped (cut) when an engine rotating acceleration a becomes greater than a certain value A (a>A).
Figure 13:
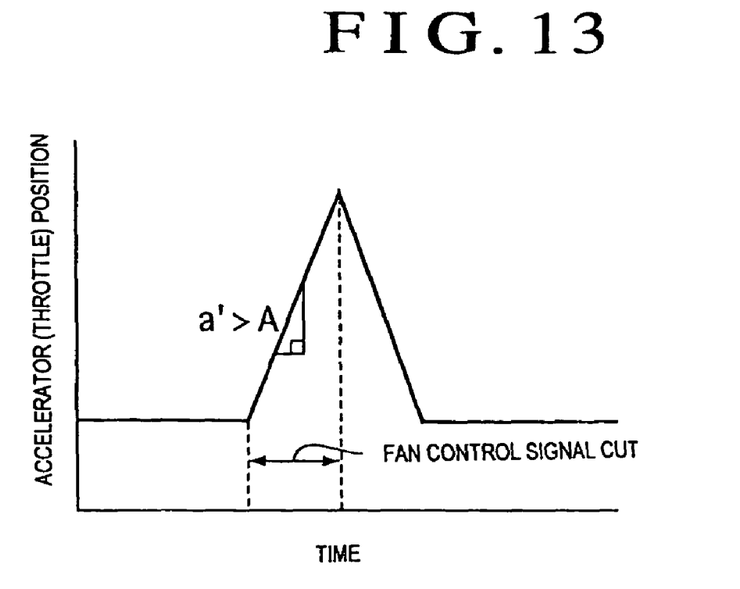
FIG. 13 is a view showing a control example in which the fan rotating speed control signal is stopped (cut) when an accelerator (throttle) position acceleration a' becomes greater than the certain value A (a'>A).

FIGS. 12 and 13 show control examples for reducing the associative rotation at the changing time of the engine rotation by temporarily stopping (cutting) the fan rotating speed control signal on the basis of an engine rotating acceleration or an accelerator (throttle) position acceleration. In the control example of FIG. 12, the fan rotating speed control signal is stopped (cut) when the engine rotating acceleration a becomes greater than a certain value A (a>A). In the control example of FIG. 13, the fan rotating speed control signal is stopped (cut) when the accelerator (throttle) position acceleration a' becomes greater than the certain value A (a'>A).

Namely, it is judged in a moment that the engine rotating speed is accelerated, and the fan rotating speed control signal is stopped (cut) so that the associative rotation can be reduced.

Figure 14:
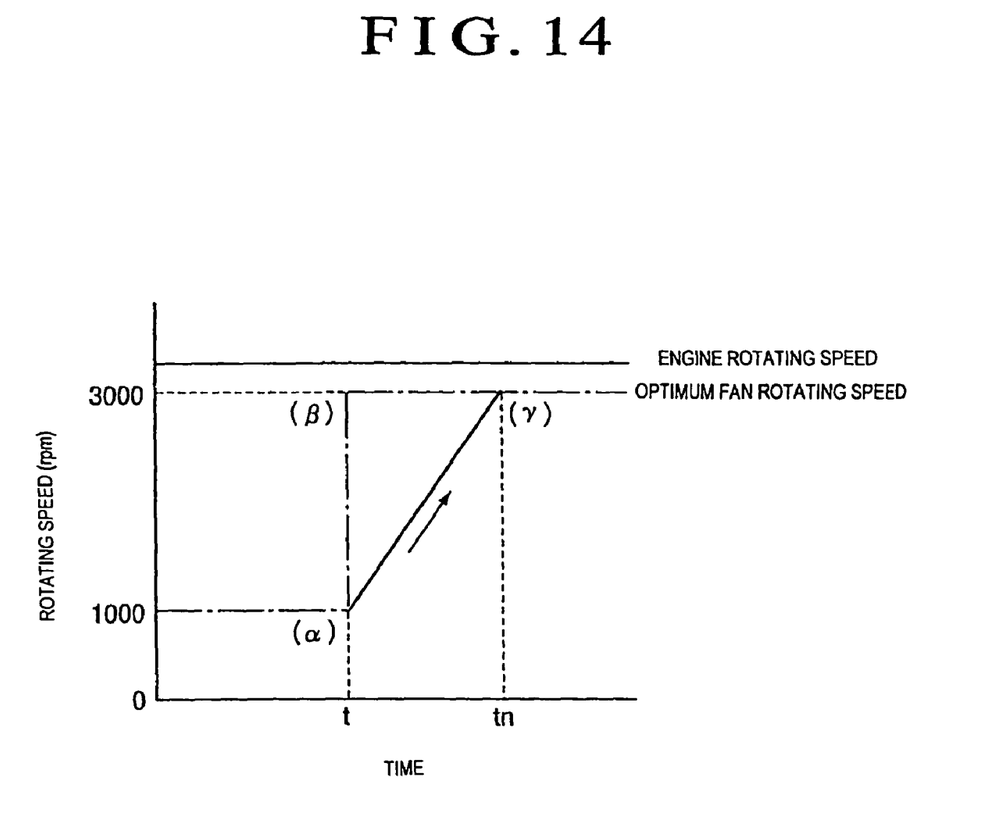
FIG. 14 is a view showing a control example for stabilizing the rotating behavior of the fan by giving a limit to a changing rate of the optimum fan rotating speed on the basis of the changing rate of the optimum fan rotating speed (ETFS).

FIG. 14 shows a control example in which the rotating behavior of the fan is stabilized by giving a limit to a changing rate of the above optimum fan rotating speed on the basis of the changing rate of the optimum fan rotating speed (ETFS). For example, as shown in FIG. 14, when the optimum fan rotating speed (ETFS) is changed from 1000 rpm ($\alpha$) to 3000 rpm ($\beta$) in timing of t, the changing rate of the optimum fan rotating speed (ETFS) per $\Delta t$ becomes 2000 rpm/$\Delta t$. Here, when there is a limit of the changing rate per $\Delta t$ (e.g., 500 rpm/$\Delta t$), the optimum fan rotating speed (ETFS) is changed from ($\alpha$) to ($\gamma$).

Namely, when the optimum fan rotating speed (ETFS) is rapidly changed for a short time, the control output of the fan rotating control system becomes unstable (the error change between the optimum fan rotating speed and the actual fan rotating speed is increased). Accordingly, convergent property becomes worse and the fan rotating behavior becomes unstable. Therefore, the error change of the optimum fan rotating speed (ETFS) can be reduced by giving a limit to the changing rate of the optimum fan rotating speed (ETFS) so that the fan rotating behavior can be stabilized.

INDUSTRIAL APPLICABILITY

The present invention is applied to the fan clutch for cooling the radiator for an automobile, and can improve engine performance, fuel cost and cooling performance of the capacitor of the air conditioner (A/C), and can restrain fan noises due to the associative rotation and can reduce a response delay with respect to control instructions of the fan rotation and can reduce the associative rotation at the changing time of the engine rotation and the engine starting time, and can stabilize the fan rotating behavior.

What is claimed is

1. A control method of an external control system fan clutch comprising:

providing on a rotating shaft, a drive disk fixed to the rotating shaft and a housing supported through a bearing on the rotating shaft, the housing having a fan coupled thereto and an interior, a partition plate in the housing and partitioning the interior into an oil reservoir chamber and a torque transmission chamber, said drive disk being in the torque transmission chamber, a torque transmission gap being defined between the drive disk and the housing at locations spaced outward from the rotating shaft, a dam arranged in one portion of an inner circumferential wall face of the housing opposed to an outer circumferential wall portion of the drive disk for collecting and reservoiring oil at a rotating time, an oil circulating flow passage through the partition plate inwardly of the torque transmission gap and a valve member comprising a spring material and having a magnetic property and being arranged within the oil reservoir chamber, the valve member having a fixed end at a radially inner position, a free end at a radially outer position, the free end being aligned for closing the oil circulating flow passage formed in the partition plate between the torque transmission chamber and the oil reservoir chamber; an armature between the fixed and the free end, an electromagnet supported by said rotating shaft through the bearing on the oil reservoir chamber side of said housing, and the electromagnet being aligned with the armature for controlling the opening and closing of the oil circulating flow passage;

utilizing a spring characteristic of the spring material of the valve member for biasing the valve member against the partition plate for keeping the oil circulating flow passage in a normally closed condition while keeping the valve member substantially free of magnetic forces acting thereon;

selectively operating the electromagnet in response to detected signals indicating a need for an increased rotational speed of the housing for attracting the valve member and deflecting the valve member away from the partition plate for opening the oil circulating flow passage to permit a flow of oil into the torque transmission gap between the drive disk and the housing to increase an effective contact area of the oil in the torque transmission gap; and selectively turning off the electromagnet in response to detected signals indicative of the requirement for a slower rotational speed of the housing so that the valve member is substantially free of magnetic forces and is biased into the normally closed condition by the spring material for controlling rotating torque transmission from a drive side to a driven side by increasing and decreasing an effective contact area of the oil in the torque transmission gap; wherein the operation of the electromagnet, for opening the oil circulating flow passage, and a turning-off of the electromagnet, so that the spring material biases the valve member against the partition plate for closing the oil circulating flow passage, are controlled via a fan rotating speed control signal by setting an upper limit rotating speed lower than a turning-on rotating speed with respect to an optimum fan rotating speed required from an engine, which is coupled to the housing, during normal operation, whereby a response delay with respect to the a subsequent fan rotating speed control signal can be shortened and an associative rotation of the housing at an engine rotation changing time and an engine starting time can be reduced.

2. The control method of the external control type fan clutch according to claim 1, wherein a magnetic material of a ring shape is arranged between said electromagnet and the valve member, and is constructed by assembling the magnetic material into the housing so as to transmit a magnetic flux of the electromagnet to the valve member through the magnetic material.

3. The control method of the external control type fan clutch according to claim 1, wherein the step of selectively operating the electromagnet in response to signals indicating a need for an increased rotational speed of the housing comprises detecting a plurality of signals including: a temperature of cooling liquid of a radiator, a fan rotating speed, a temperature of transmission oil, a vehicle speed, the engine rotating speed, a pressure of a compressor of an air conditioner, and a turning-on or a turning-off signal of an air conditioner.

* * * * *